(12) United States Patent
Williams

(10) Patent No.: US 6,648,589 B2
(45) Date of Patent: Nov. 18, 2003

(54) HYDROELECTRIC TURBINE FOR PRODUCING ELECTRICITY FROM A WATER CURRENT

(76) Inventor: Herbert Lehman Williams, 109 Rivers Edge Dr., East Palatka, FL (US) 32131

( * ) Notice: Subject to any disclaimer, the term of this patent is extended or adjusted under 35 U.S.C. 154(b) by 0 days.

(21) Appl. No.: 09/955,892

(22) Filed: Sep. 20, 2001

(65) Prior Publication Data

US 2002/0034437 A1 Mar. 21, 2002

Related U.S. Application Data

(60) Provisional application No. 60/233,753, filed on Sep. 19, 2000.

(51) Int. Cl.$^7$ .................................................. F03B 7/00
(52) U.S. Cl. ............................ 415/1; 415/4.3; 415/906; 415/908; 416/DIG. 4
(58) Field of Search ........................... 415/3.3, 4.3, 4.5, 415/2.1, 91, 906, 908, 1; 416/DIG. 4, 189, 193 R; 290/42, 43, 53, 54

(56) References Cited

U.S. PATENT DOCUMENTS

| | | | | | |
|---|---|---|---|---|---|
| 2,652,505 | A | * | 9/1953 | Matheisel | 310/67 R |
| 4,163,904 | A | * | 8/1979 | Skendrovic | 290/54 |
| 4,272,686 | A | * | 6/1981 | Suzuki | 290/54 |
| 5,592,816 | A | * | 1/1997 | Williams | 60/398 |

* cited by examiner

Primary Examiner—Edward K. Look
Assistant Examiner—Dwayne J. White

(57) ABSTRACT

The invention takes energy from the periphery of a hydro electric turbine blade to produce electricity by mechanically driving a plurality of generators without the use of a hydraulic system.

10 Claims, 2 Drawing Sheets

FRONT VIEW 1-2

FRONT VIEW

SIDE VIEW

HYDROELECTRIC TURBINE FOR PRODUCING ELECTRICITY FROM A WATER CURRENT

CROSS-REFERENCE TO RELATED APPLICATIONS

The invention is a machine for producing electricity from a water current. A provisional application 60/233,753 filing date Sep. 19, 2000 has been filed.

"Not applicable"

STATEMENT REGARDING FEDERALLY SPONSORED RESEARCH OR DEVELOPMENT

"Not applicable"

REFERENCE TO A MICROFICHE APPENDIX

"Not applicable"

BACKGROUND OF THE INVENTION

Hydroelectric turbine runners (blades) are very efficient at extracting the energy from a fast moving water current (high head) but not very efficient with slower currents (low head). The reason for this problem is that existing runners (blades) rotate around a central shaft which restricts their ability to have very large diameters due to weight and structural limitations. Low head currents contain less energy per a given cube of water and therefore require a larger blade surface area. This invention deals with this situation in three basic ways.

1. By eliminating the central area of the blade where the most weight and drag occur.
2. By taking the energy from the blade perimeter (outer blade tips).
3. By designing the blades of very large diameters to also have larger open areas in their centers.

By incorporating the above 3 ideas, the invention can be built ever larger which gives the large blade area needed for low head applications while holding weight and drag to a minimum. In essence, the hole in the center continues to get larger which increases the blade area accordingly but the structural limitations, weight and drag are held to a minimum.

BRIEF SUMMARY OF THE INVENTION

The invention is a machine designed to be capable of having a very large blade area while eliminating some inherent problems of existing blade technologies. This is accomplished by taking the energy of the blade from the periphery and not a central shaft. This is seen in U.S. Pat. No. 5,592,816 HYDROELECTRIC POWERPLANT. While that patent incorporates a hydraulic system to take the energy from the blade to the generator, this machine takes the energy from the blade to a generator (or generators) by the use of a mechanical means thereby eliminating the hydraulic system altogether which allows for the blades to be built very large in size.

DETAILED DESCRIPTION OF THE INVENTION

Figure 1:
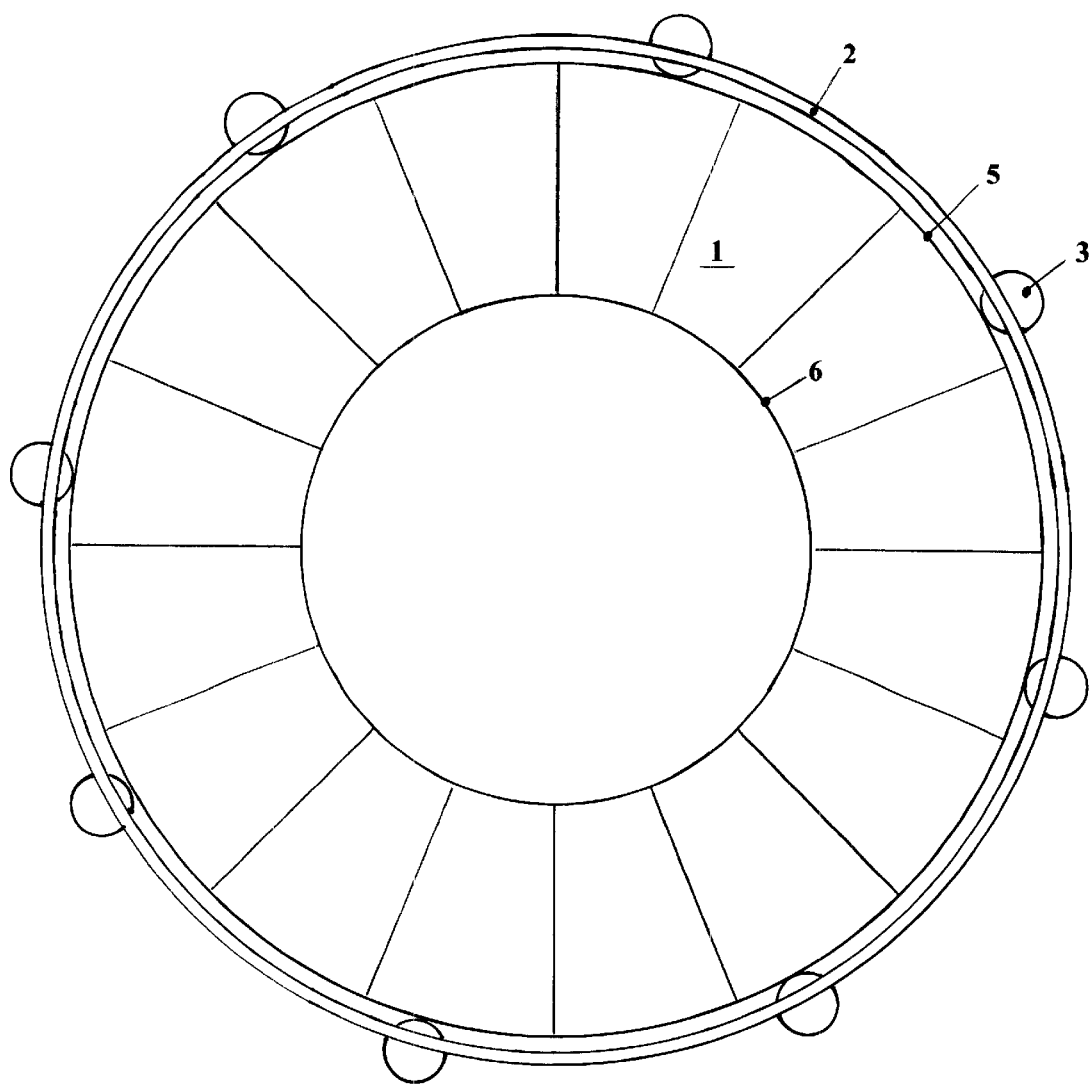
FIG. 1 is the turbine blade as seen from upstream or downstream.

This invention is an improvement on what is old (a method of taking the energy from the periphery of a turbine blade by the use of a hydraulic system). See U.S. Pat. No. 5,592,816.

This machine is new in that it takes the energy from the periphery of a turbine blade by the use of a mechanical means thereby eliminating the need for a hydraulic system. This allows for the blade to be built to a very large diameter by reducing the weight and drag of the central area.

The water current flows through the housing 2 of the embodiment which causes the blade 1 to rotate which causes the device 3 to rotate which causes the generator 4 to rotate which produces electricity.

The blade 1 is not mechanically attached to the housing 2 but is held on location by the device 3 which is mechanically attached to the generator 4 which is mechanically attached to the housing 2.

The device 3 is pressed against the rim 5 of the blade 1, which causes the friction necessary for rotation of the device 3, which causes rotation of the generator 4. The axis of the device 3 can be parallel or perpendicular to the direction of water flow. In (FIG. 1) and (FIG. 2) it is shown to be parallel and pressing against the outer rim of the blade. In a perpendicular configuration (which is not shown in the drawings) it would be behind the blade which would keep the blade from being pushed downstream by the water force.

Figure 2:
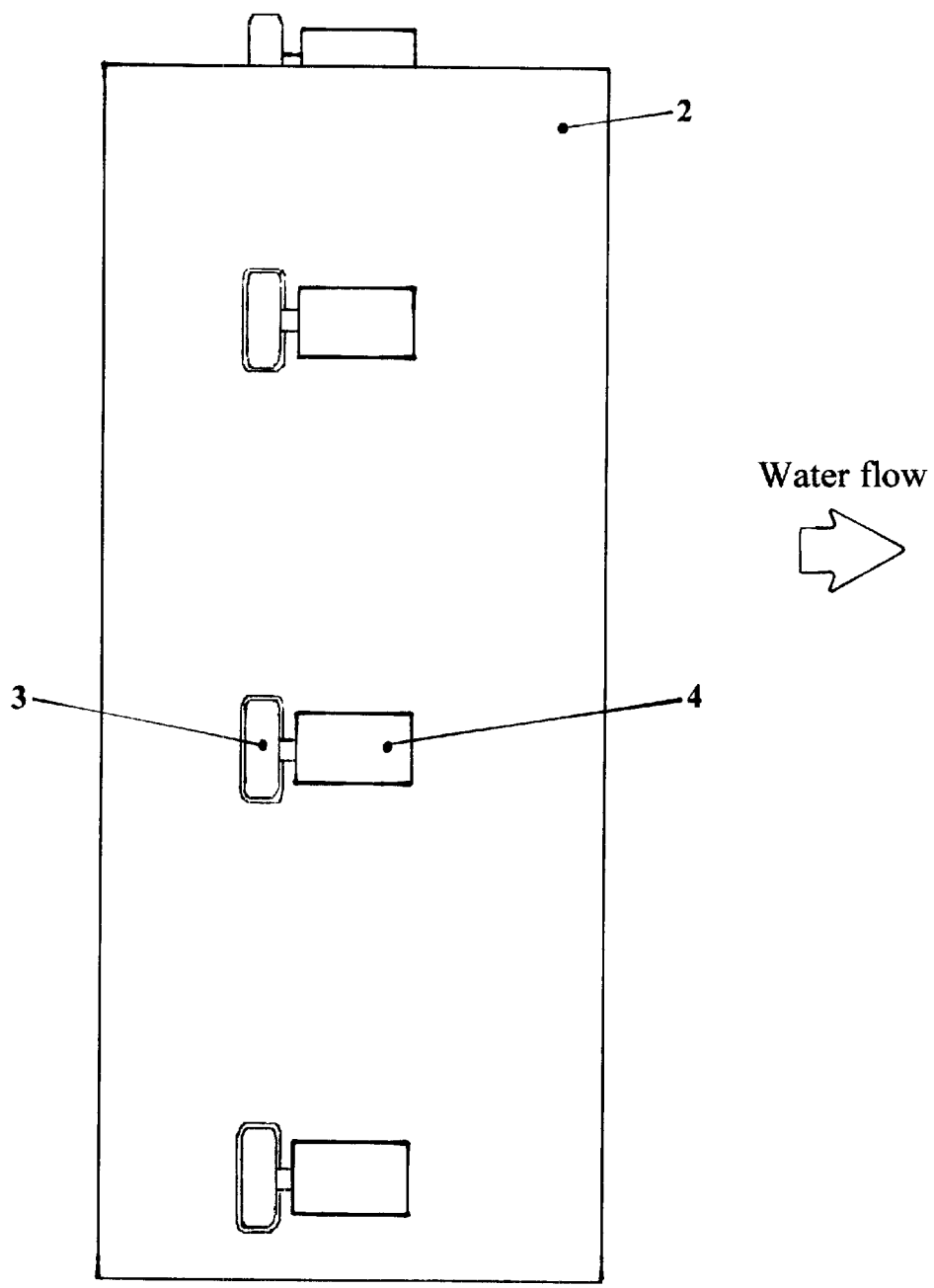
FIG. 2 is a side view of the housing.

The center of the blade 1 is an open area with an inner rim 6 as is shown in (FIG. 1). As the water which flows unrestricted through the center of the blade 1 combines downstream with the water which flows through the blade 1, a friction is induced between the two water flows which aids in increasing the velocity of the water flowing through the blade 1. This increased velocity of the water downstream of blade 1 aids in pulling the water through the blade at an increased speed which contributes to a higher blade efficiency than would have been possible with a central hub and shaft type blade.

The open area through the center of the blade 1 eliminates the turbulence that occurs behind the hub and shaft of existing turbine blades.

What is claimed is:

1. A turbine which has a plurality of electric generators attached to its housing and said plurality of electric generators get rotational energy from the periphery of at least one turbine blade, which rotates within and is held in place by said turbine housing and at least one electric generator having a devise mechanically attached to the shaft of said at least one electric generator which said device gets its rotational energy from being pressed against the rim of a turbine blade and said turbine having an open area through the center of its blade which reduces the weight and drag of said blade.

2. A method of getting rotational energy from the periphery of a turbine blade of claim 1 by frictionally contacting the periphery of said turbine blade with a device which is mechanically connected to the shaft of at least one electric generator.

3. A method of generating electricity by having at least one electric generator of claim 1 attached to the periphery of a turbine housing and said at least one electric generator getting its rotational energy from at least one rotating blade located within said turbine housing without the use of a hydraulic system to transfer said energy.

4. A hydro electric turbine of claim 1 which produces electricity by at least one electric generator attached to the periphery of said hydro electric turbine and getting the rotational energy to turn said at least one electric generator from the periphery of a turbine blade.

5. A method of reducing the weight and drag on the turbine blade of claim 1 by taking energy from the blade periphery thereby eliminating the need for a central shaft and hub.

6. A method of transferring the energy from a hydro electric turbine blade of claim 1 to a generator by the use of friction to turn the generator.

7. A method of rotating a plurality of electric generators of claim 1 from one turbine blade by having said generators evenly spaced around the periphery of said blade and frictionally in contact with said blade.

8. A method of keeping a rotating turbine blade of claim 1 centrally located within a stationary outer housing by said blade being frictionally connected to the housing at a plurality of locations around the periphery of the said blade.

9. A method of using the water which flows through the unrestricted open area in the center of a turbine blade of claim 1 to increase the downstream velocity of the water which flows through the turbine blade.

10. A method of reducing downstream turbulence on a turbine blade of claim 1 by allowing an unrestricted flow of water through an open area in the center of the blade.

* * * * *